United States Patent
Kawaguchi

(10) Patent No.: US 7,058,744 B2
(45) Date of Patent: Jun. 6, 2006

(54) CLUSTER SYSTEM, COMPUTER AND PROGRAM

(75) Inventor: Shinichi Kawaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 349 days.

(21) Appl. No.: 10/145,881

(22) Filed: May 16, 2002

(65) Prior Publication Data

US 2002/0174165 A1   Nov. 21, 2002

(30) Foreign Application Priority Data

May 18, 2001   (JP)   ............................. 2001-148687

(51) Int. Cl.
*G06F 13/32* (2006.01)
(52) U.S. Cl. ...................... 710/268; 710/262
(58) Field of Classification Search ................ 710/260, 710/268
See application file for complete search history.

(56) References Cited

U.S. PATENT DOCUMENTS

| | | | |
|---|---|---|---|
| 5,123,094 A | | 6/1992 | MacDougall |
| 5,689,713 A | * | 11/1997 | Normoyle et al. .......... 710/263 |
| 6,092,098 A | * | 7/2000 | Araki et al. ................. 709/201 |
| 6,105,071 A | * | 8/2000 | Desnoyers et al. ......... 709/237 |
| 6,148,361 A | * | 11/2000 | Carpenter et al. .......... 710/260 |
| 6,295,585 B1 | * | 9/2001 | Gillett et al. ............... 711/148 |
| 6,799,317 B1 | * | 9/2004 | Heywood et al. ........... 710/260 |

FOREIGN PATENT DOCUMENTS

| | | |
|---|---|---|
| EP | 0 580 961 | 2/1994 |
| JP | 1-154272 A | 6/1989 |
| JP | 5-73518 A | 3/1993 |
| JP | 7-160657 A | 6/1995 |
| JP | 9-16542 A | 1/1997 |
| JP | 11-66022 A | 3/1999 |
| JP | 2000-181886 A | 6/2000 |
| JP | 2000-215182 A | 8/2000 |
| WO | WO 96/29656 | 9/1996 |

* cited by examiner

*Primary Examiner*—Glenn A. Auve
(74) *Attorney, Agent, or Firm*—Sughrue Mion, PLLC

(57) ABSTRACT

An interrupt generating register within an interrupt control circuit is mapped in a memory space of the node. By issuing a store command to the memory space, the node transmits the store command to an address of the interrupt generating register via a network. An interrupt control circuit receives the store command, generates an interrupt command, and transmits the generated interrupt command to a CPU module.

28 Claims, 15 Drawing Sheets

CLUSTER SYSTEM, COMPUTER AND PROGRAM

BACKGROUND OF THE INVENTION

The present invention relates to a cluster system in which a plurality of computers connected to a network operate correlatively, a computer for use in a cluster system, and a program for causing a computer to execute.

Conventionally, a cluster system has been developed aimed at improving a processing capacity and so forth by connecting a plurality of computers (in general, a multi-process computer) via a network to cause these computers to operate correlatively (for example, as to the cluster system, see Japanese Patent Application No. 160657/1995, Japanese Patent Application No. 66022/1999, and Japanese Patent Application No. 2151821200.0. Also, as to a data transfer in a multi-process computer, see Japanese Patent Application No. 154272/1989 and Japanese Patent Application No. 73518/1993).

FIG. 14 is a block diagram illustrating a conventional, and general cluster system. In FIG. 14, a plurality of computers (in the cluster system, each computer is referred to as a node) 1 and 2 are connected via a network 3.

Nodes 1 and 2 comprise a plurality of central processing units (CPUs) 4 to 6 and 13 to 15, node controllers 8 and 17, main memories 9 and 18, input/output (I/O) controllers 11 and 20, which are input/output devices, and network adapters 12 and 21 respectively.

The CPUs 4 to 6 and the node controller 8 are connected to a CPU bus 7, and the CPUs 13 to 15 and the node controller 17 are connected to a CPU bus 16. Also, the node controller 8, the I/O controller 11 and the network adapter 12 are connected to an I/O adapter bus 10 and the node controller 17, the I/O controller 20 and the network adapter 21 are connected to an I/O adapter bus 19.

The network adapters 12 and 21 are connected to the network 3 via inter-node connection buses 22 and 23 respectively.

The node controllers 8 and 17 control the CPU buses 7 and 16 and the I/O adapter buses 10 and 19 respectively, and are interconnections of main memories 9 and 18. To the I/O adapter buses 10 and 19 are connected a secondary memory device such as a magnetic disk (not shown) in addition to the I/O controllers 11 and 20 and the network adapters 12 and 21 respectively. Said secondary memory device is connected to the I/O adapter bus 10 via a PCI (Peripheral Component Interconnect) board and a SCSI (Small Computer System Interface).

A couple of the computers 1 and 2 are connected to the network adapters 12 and 21.

In the cluster system configured above, between the network adapters 12 and 21 that are network devices, transmission/reception of data is performed with a unit of a packet. As to the packet, depending upon a mounting method of the network connection device and the type of the network itself that configures the system, the longest packet length thereof is decided. In the event that the network connection device is an ethernet control device that is generally used, the longest packet length is said to be 1500 bytes. It is called a fragment to transmit data by splitting transfer data into the maximum transfer packet.

For example, in the event that data transmission is performed between nodes with a TCP (Transmission Control Protocol), when its data length is larger than the size of data that the network connection device can transmit at a time, the data is partitioned into the longest packet length at which the network connection device can transmit, is split into the packet, and transmitted. No means exists in the TCP for executing an interrupt by means of software, and the interrupt is adapted to be generated by means of hardware every time each packet is finished, whereby the network connection device of a receiving side node generates the interrupt for the CPU within its own node every time each packet is received, and performs an interrupt process of determining whether or not its packet is a final packet of the transfer data. At this moment, in the event that data transfer amount between the nodes is large, the packets to be split are numerous, and the problem existed that many of the interrupts to be generated for each reception of the packets became useless interrupt processes.

Also, it is the data transmission/reception between the network connection devices, which passed through the secondary memory device and the I/O adapter buses 10 and 19 to which the I/O controllers 11 and 20 were connected, whereby the problem existed that overhead of data transmission itself also was large. Hence, as shown in a conventional example of FIG. 15, the cluster system is being developed in which the connection is made between a plurality of nodes 31 and 32 not via the I/O adapter buses 10 and 19 but via node controllers 33 and 34. Additionally, in FIG. 15, identical codes are appended to identical parts to that of FIG. 14.

In the cluster system shown in FIG. 15, so as to do away with the above-mentioned interrupt overhead, in many cases a method (flag method) is employed that a transmitting side node also transmits special data referred to as a flag, together with data to be transmitted, and informs completion of the data transmission. In this flag method, a receiving side node reads (polls) a flag repeatedly while receiving the data, upon receiving a flag that indicates TRUE (=completion of data transmission), concludes that the data reception was completed, and starts a process employing the received data. This method enables the problem of the above-mentioned interrupt overhead to be settled, and enables the completion of the data reception to be known instantly, whereby a high-speed response can be realized to an application that is in the condition of waiting for the data on the receiving side.

In the event of employing the above-mentioned flag method, however, in the receiving side node, the application that is in the condition of constantly waiting for the data is required to continue the polling of the flag, whereby a certain specific application uses the CPU of the receiving side node for polling, and the problem exists that a time for using the CPU is wasted.

Also, in addition to the above-mentioned two problems, in the cluster system, many nodes communicate data respectively, whereby a risk exists of having a harmful influence upon the other nodes caused by a certain node's malfunction. In order to construct a cluster system with high availability, as in the case of the interrupt method previously mentioned, a mechanism (security mechanism) is needed for guarding against interrupt by the node to which the malfunction occurred.

Accordingly, a scheme has been required for settling the problem of the interrupt overhead by the fragment mentioned, and the problem of the polling in the flag form, and for enabling the security mechanism to be maintained.

SUMMARY OF THE INVENTION

The present invention has a task to execute an interrupt transfer between the nodes with low latency. Also, the present invention has a task to reduce the overhead caused by the interrupt. Further, the present invention has a task to realize improvement of security.

In accordance with the present invention, a cluster system is provided in which a plurality of nodes connected to a network operate cooperatively, characterized in comprising: an interrupt issuing source node for, by relating a predetermined component for an interrupt issuing destination node to an interrupt issuing region in its own memory space to issue predetermined information to said interrupt issuing region, transmitting said predetermined information to an address of said predetermined component for said interrupt issuing destination node; and an interrupt issuing destination node having control means for, by receiving said predetermined information addressed to said predetermined component to transmit an interrupt command to a CPU within its own node, causing said CPU to generate an interrupt.

The interrupt issuing source node relates the predetermined component for the interrupt issuing destination node to the interrupt issuing region in its own memory space, and issues predetermined information to said interrupt issuing region, thereby transmitting said predetermined information to an address of said predetermined component for said interrupt issuing destination node. The control means of the interrupt issuing destination node receives said predetermined information addressed to said predetermined component and transmits an interrupt command to a CPU within its own node, thereby causing said CPU to generate an interrupt.

Herein, said predetermined component may be configured of memory means.

Also, the system may be configured so that: said interrupt issuing destination node includes access permissible node information memory means for storing information for determining a node that said interrupt issuing destination node itself permits to make access; and when said control means received said predetermined information, it refers to said access permissible node information memory means, and in the event of a node that is permitted to make access by the interrupt issuing source node which transmitted said predetermined information, transmits said interrupt command.

Also, said access permissible node information memory means may be configured of an interrupt mask register in which was established information for determining a node that said interrupt issuing destination node itself permits to make access.

Also, the system may be configured so that: said memory means includes an interrupt generating register related to the interrupt issuing region in said memory space, and an interrupt destination CPU specifying register in which was established information for indicating an interrupt destination CPU; said interrupt issuing source node issues said predetermined information to said interrupt issuing region, thereby transmitting said predetermined information to an address to said interrupt generating register; and the control means of said interrupt issuing destination node receives said predetermined information issued to an address of said interrupt generating register, and transmits said interrupt command to the CPU established as said interrupt destination CPU specifying register.

Also, the system may be configured so that: said memory means further includes an interrupt mask register in which was established information for determining a node that said memory means itself permits to make access; and when the control means of said interrupt issuing destination node received said predetermined information, it refers to information established in said interrupt mask register, and in the event of a node that is permitted to make access by said interrupt issuing source node, transmits said interrupt command.

Also, the system may be configured so that: said memory means further includes an interrupt factor register for storing information on the interrupt issuing source node; when the control means of said interrupt issuing destination node received said predetermined information, it stores said information on the interrupt issuing source node in said interrupt factor register; and said CPU performs an interrupt process by referring to the information on the interrupt issuing source node stored in said interrupt factor register.

Also, the system may be configured so that: said interrupt issuing region is provided in a global memory space to which the other nodes can make direct access, together with it, said interrupt issuing region is related to said predetermined components of a plurality of the interrupt issuing destination nodes; and said interrupt issuing source node issues said predetermined information to the interrupt issuing region related to said predetermined component of said interrupt issuing destination node, thereby transmitting said predetermined information to an address of said predetermined component of said interrupt issuing destination node that corresponds.

Also, the system may be configured so that: said interrupt issuing region is provided in a local memory space to which only its own node can make direct access, and together with it, is configured of an interrupt issuing destination node specifying region for specifying the interrupt issuing destination node, and an interrupt generating region for issuing said predetermined information; and after said interrupt issuing source node specified the interrupt issuing destination node as said interrupt issuing destination node specifying region, it issues said predetermined signal to said interrupt generating region, thereby transmitting said predetermined information to said interrupt issuing destination node was specified.

Also, in accordance with the present invention, is provided a computer, characterized in, by relating a predetermined component for an interrupt issuing destination node to an interrupt issuing region in its own memory space to issue predetermined information to said interrupt issuing region, transmitting said predetermined information to an address of said predetermined component for said interrupt issuing destination node. By relating a predetermined component for an interrupt issuing destination node to an interrupt issuing region in its own memory space to issue predetermined information to said interrupt issuing region, said predetermined information is transmitted to an address of said predetermined component for said interrupt issuing destination node.

Herein, said predetermined component may be configured of memory means.

Also, the system may be configured so that: said interrupt issuing region is provided in a global memory space to which the other nodes can make direct access, together with it, said interrupt issuing region is related to said predetermined components of a plurality of the interrupt issuing destination nodes; and by issuing said predetermined information to the interrupt issuing region related to said predetermined component of said interrupt issuing destination node, said predetermined information is transmitted to an address of said predetermined component of said interrupt issuing destination node that corresponds.

Also, the system may be configured so that: said interrupt issuing region is provided in a local memory space to which only its own node can make direct access, and together with it, is configured of an interrupt issuing destination node specifying region for specifying the interrupt issuing destination node, and an interrupt generating region for issuing said predetermined information; and after said interrupt issuing destination node was specified as said interrupt issuing destination node specifying region, by issuing said predetermined signal to said interrupt generating region, said predetermined information is transmitted to said interrupt issuing destination node that was specified.

Also, in accordance with the present invention, is provided a computer including: control means for, by receiving predetermined information addressed to a predetermined component of its own to transmit an interrupt command to its own CPU, causing said CPU to generate an interrupt; and access permissible node information memory means for storing information for determining a node that said access permissible node information memory means itself permits to make access, characterized in that, when said control means received said predetermined information, it refers to said access permissible node information memory means, and in the event of a node that is permitted to make access by the interrupt issuing source node which transmitted said predetermined information, transmits said interrupt command. When said control means received said predetermined information, it refers to said access permissible node information memory means, and in the event of a node that is permitted to make access by the interrupt issuing source node which transmitted said predetermined information, transmits said interrupt command.

Herein, said predetermined component may be configured of memory means.

Also, said access permissible node information memory means may be configured of an interrupt mask register in which was established information for determining a node that said access permissible node information memory means itself permits to make access.

Also, the system may be configured so that: said memory means includes an interrupt generating register related to the interrupt issuing region in said memory space, and an interrupt destination CPU specifying register in which was established information for indicating the interrupt destination CPU; and said control means receives said predetermined information issued to an address of said interrupt generating register, and transmits said interrupt command to the CPU established as said interrupt destination CPU specifying register.

Also, the system may be configured so that: said memory means further includes an interrupt factor register for storing information on the interrupt issuing source node; when the control means received said predetermined information, it stores said information on the interrupt issuing source node in said interrupt factor register; and said CPU performs an interrupt process by referring to information on the interrupt issuing source node stored in said interrupt factor register.

Also, in accordance with the present invention, is provided a program, characterized in, by relating a predetermined component for an interrupt issuing destination node to an interrupt issuing region in its own memory space to issue predetermined information to said interrupt issuing region, causing a computer to function so as to transmit said predetermined information to an address of said predetermined component for said interrupt issuing destination node. By executing a program, by relating a predetermined component for an interrupt issuing destination node to an interrupt issuing region in its own memory space to issue predetermined information to said interrupt issuing region, the computer functions so as to transmit said predetermined information to an address of said predetermined component for said interrupt issuing destination node.

Herein, the program may be configured to cause the computer to function so that, by providing said interrupt issuing region in a global memory space to which the other nodes can make direct access, together with it, to relate said interrupt issuing region to said predetermined component of a plurality of the interrupt issuing destination nodes, and to issue said predetermined information to the interrupt issuing region related to said predetermined component of said interrupt issuing destination node, said predetermined information is transmitted to an address of said predetermined component of said interrupt issuing destination node that corresponds.

Also, the program may be configured to cause the computer to function so that, by providing said interrupt issuing region in a local memory space to which only its own node can make direct access, together with it, to configure said interrupt issuing region of an interrupt issuing destination node specifying region for specifying the interrupt issuing destination node, and an interrupt generating region for issuing said predetermined information, and after having specified said interrupt issuing destination node as said interrupt issuing destination node specifying region, to issue said predetermined signal to said interrupt generating region, said predetermined information is transmitted to said interrupt issuing destination node that was specified.

Also, in accordance with the present invention, is provided a program, characterized in, in having received predetermined information, by referring to access permissible node information memory means for storing information for determining a node that said access permissible node information memory means itself permits to make access, in the event of a node that is permitted to make access by the interrupt issuing source node which transmitted said predetermined information, to transmit an interrupt command to its own CPU, causing the computer to function as control means for causing said CPU to generate an interrupt. By executing the program, in having received predetermined information, by referring to access permissible node information memory means for storing information for determining a node that said access permissible node information memory means itself permits to make access, in the event of a node that is permitted to make access by the interrupt issuing source node which transmitted said predetermined information, to transmit an interrupt command to its own CPU, the computer functions as the control means for causing said CPU to generate an interrupt.

Herein, the program may be configured to cause said control means to function so that, in the event that said predetermined information is one transmitted to an address of its own predetermined component, by referring to said permissible node information memory means, in the event of a node that is permitted to make access by the interrupt issuing source node that transmitted said predetermined information, to transmit said interrupt command to its own CPU, said CPU is caused to generate an interrupt.

BRIEF DESCRIPTION OF THE DRAWINGS

This and other objects, features and advantages of the present invention will become more apparent upon a reading of the following detailed description and drawings, in which.

DETAILED DESCRIPTION OF THE INVENTION

A cluster system relating to exemplary embodiments of the present invention, a computer for use in the cluster system, and a program for causing the computer to execute will be explained below, using the accompanied drawings.

Figure 1:
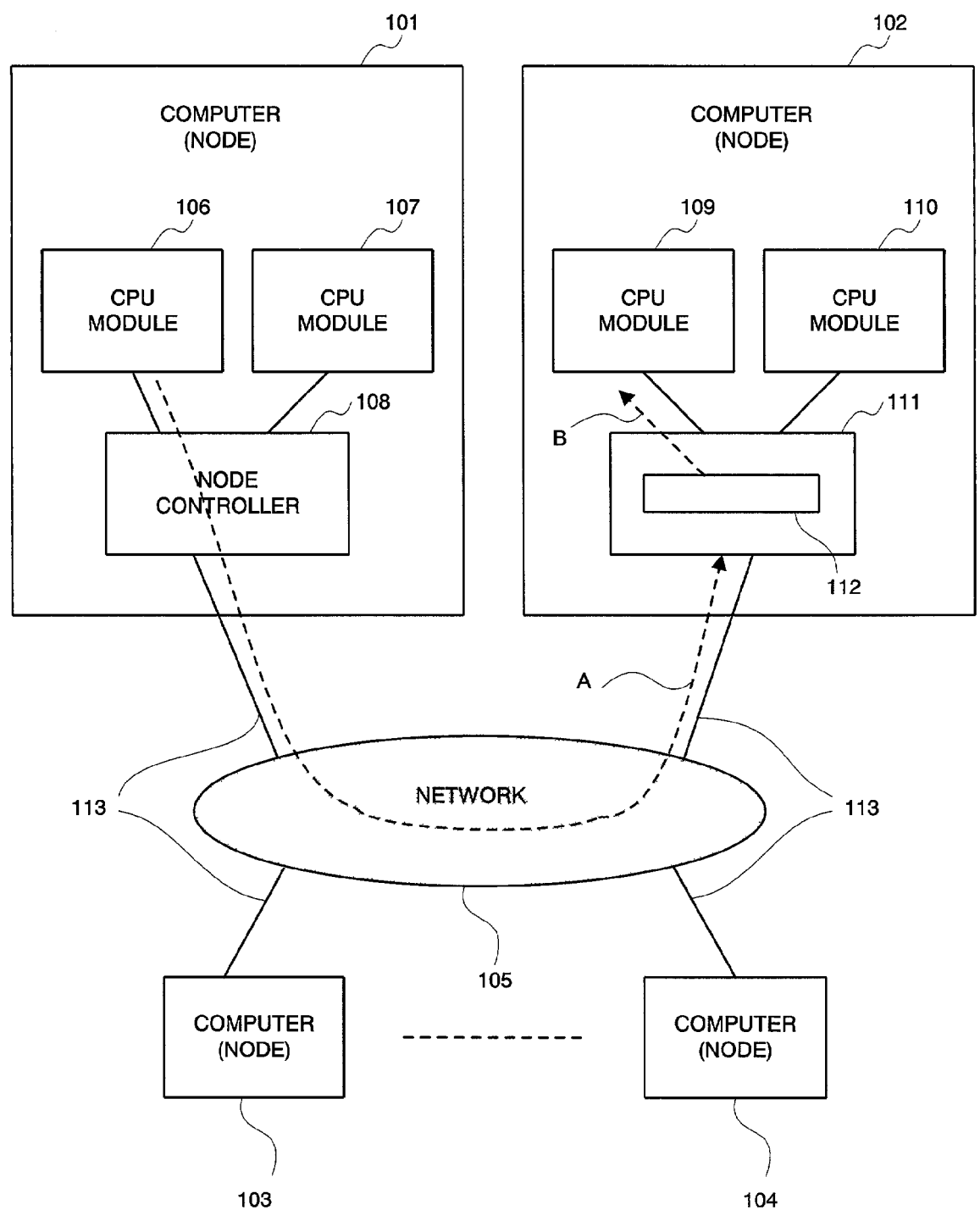
FIG. 1 is a schematic block diagram of the cluster system relating to an exemplary embodiment of the present invention.

FIG. 1 is a block diagram illustrating an outline of the cluster system relating to exemplary embodiments of the present invention. In FIG. 1, a plurality of multi-processor computers (nodes) 101 to 104 are connected to a network 105 via an inter-node connection bus 113. The configuration is made in such a manner that a plurality of nodes 101 to 104 are connected to the network 105, and operate cooperatively in the cluster system.

The nodes 101 to 104 are computers having an identical configuration respectively, and in FIG. 1 the internal configuration of nodes 101 and 102 are illustrated schematically. The nodes 101 and 102 comprise a plurality of central processing unit (CPU) modules 106 and 107, and 109 and 110, and node controllers 108 and 111 respectively. The node controllers 108 and 111 have an interrupt control circuit internally as the control means, and only the interrupt control circuit 112 of the node controller 111 is illustrated in FIG. 1.

The details will be described later, but an outline of an operation is now given of generating the interrupt between the nodes in the cluster system shown in FIG. 1, and in the event of issuing the interrupt from the node 101 to the node 102, predetermined information (e.g. a store command) A is issued from the CPU module 106 of the interrupt issuing source node 101, and the interrupt control circuit 112 of the interrupt issuing destination node 102 receives said store command, converts it into an interrupt command B, and transmits it to the CPU module 109 to perform an interrupt process.

Figure 2:
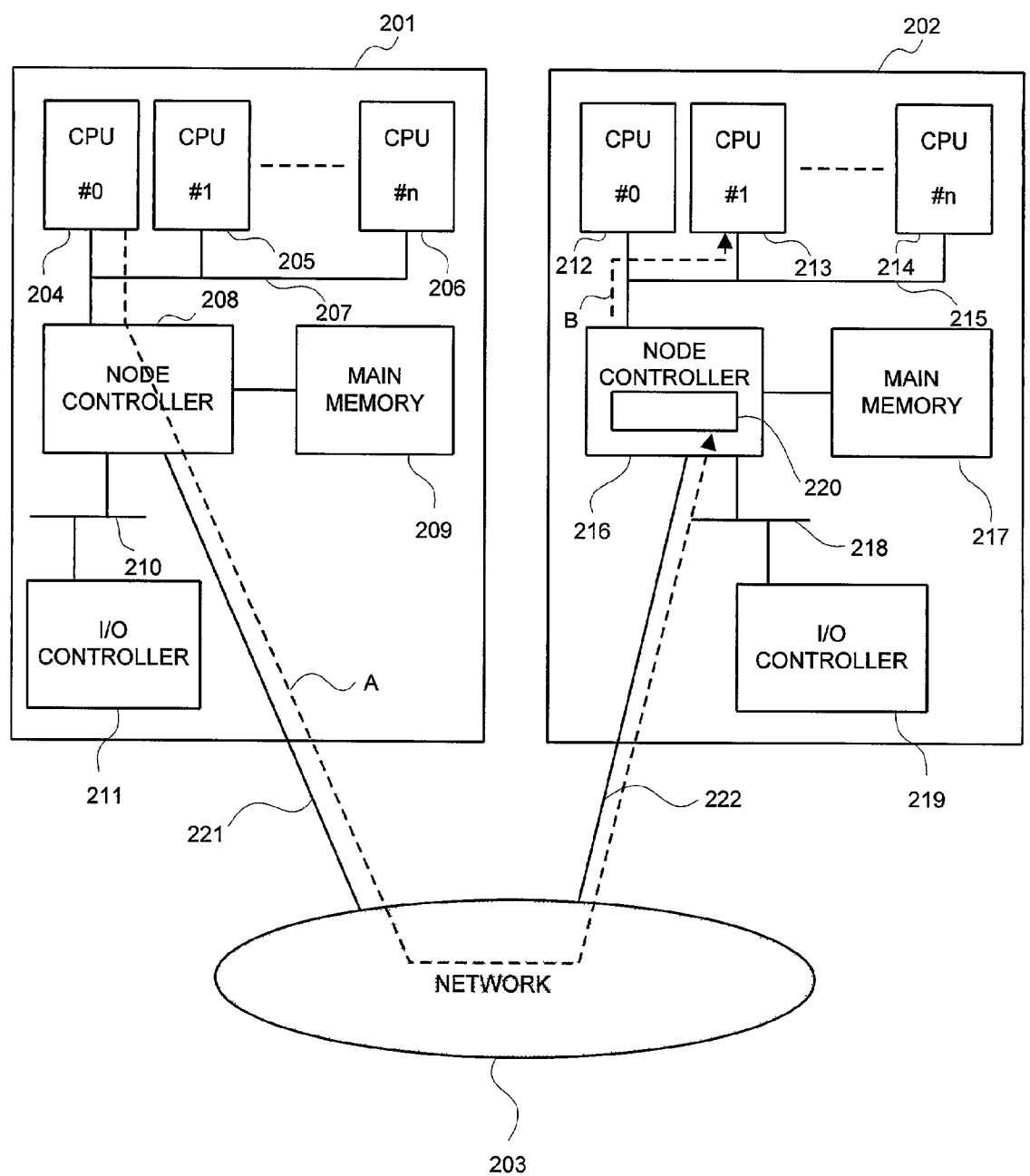
FIG. 2 is a detailed block diagram of the cluster system relating to an exemplary embodiment of the present invention.

FIG. 2 is a detailed block diagram of the cluster system shown in FIG. 1, wherein a configuration of two nodes 201 and 202 connected to a network 203 is illustrated.

The nodes 201 and 202, which are computers having an identical configuration, comprise a plurality of central processing units (CPUs) 204 to 206, and 212 to 214, node controllers 208 and 216, main memories 209 and 217, and input/output (I/O) controllers 211 and 219, which are input/output devices, respectively.

The CPUs 204 to 206 and the node controller 208 are connected to a CPU bus 207, and the CPUs 212 to 214 and the node controller 215 are connected to a CPU bus 215. Also, the node controller 208 and the I/O controller 211 are connected to an I/O adapter bus 210, and the node controller 216 and the I/O controller 219 are connected to an I/O adapter bus 218. The node controllers 208 and 216 are connected to the network 203 via inter-node connection buses 221 and 222 respectively.

The node controllers 208 and 216 control exchange of data among the CPUs 204 to 206, and 212 to 214, main memories 209 and 217, and the input/output devices in each of nodes 201 and 202, a coherency process within each of the nodes 201 and 202, and so forth.

The node controllers 208 and 216, include an interrupt control circuit that has a function of transferring the interrupt into a companion node, and together with it, has a function of converting the store command received from the other nodes into an interrupt command to transmit it to the CPU of its own node. In FIG. 2, only an interrupt control circuit 220 of the node controller 216 is illustrated.

Figure 3:
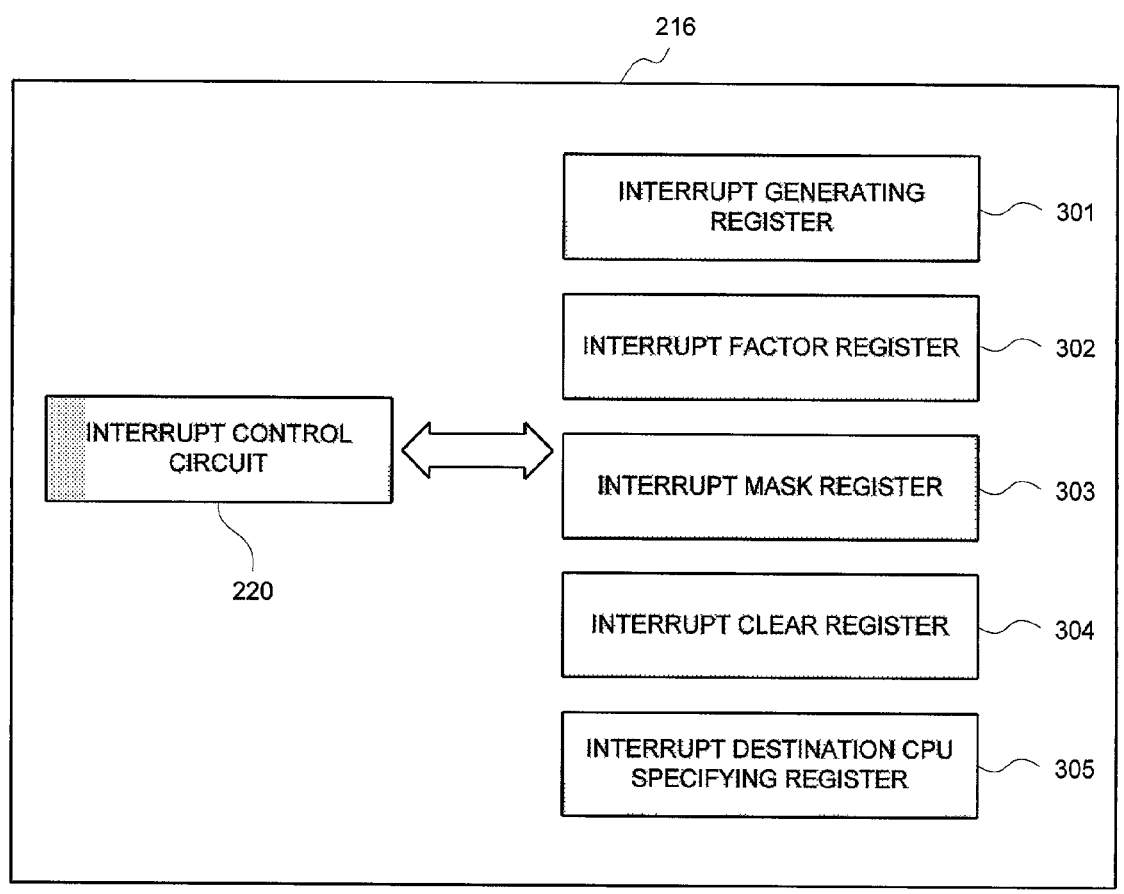
FIG. 3 is a diagram illustrating a register configuration for use in an exemplary embodiment of the present invention.

Also, as shown in FIG. 3, the interrupt control circuit 220 within the node controller 216 is provided with a plurality of registers for controlling an inter-node interrupt. In FIG. 3, the interrupt control circuit 220 includes registers for the interrupt between nodes of an interrupt generating register 301, an interrupt factor register 302, an interrupt mask register 303, an interrupt clear register 304, and an interrupt destination CPU specifying register 305. The interrupt control circuit 220 also controls each of said registers 301 to 305.

Figure 4:
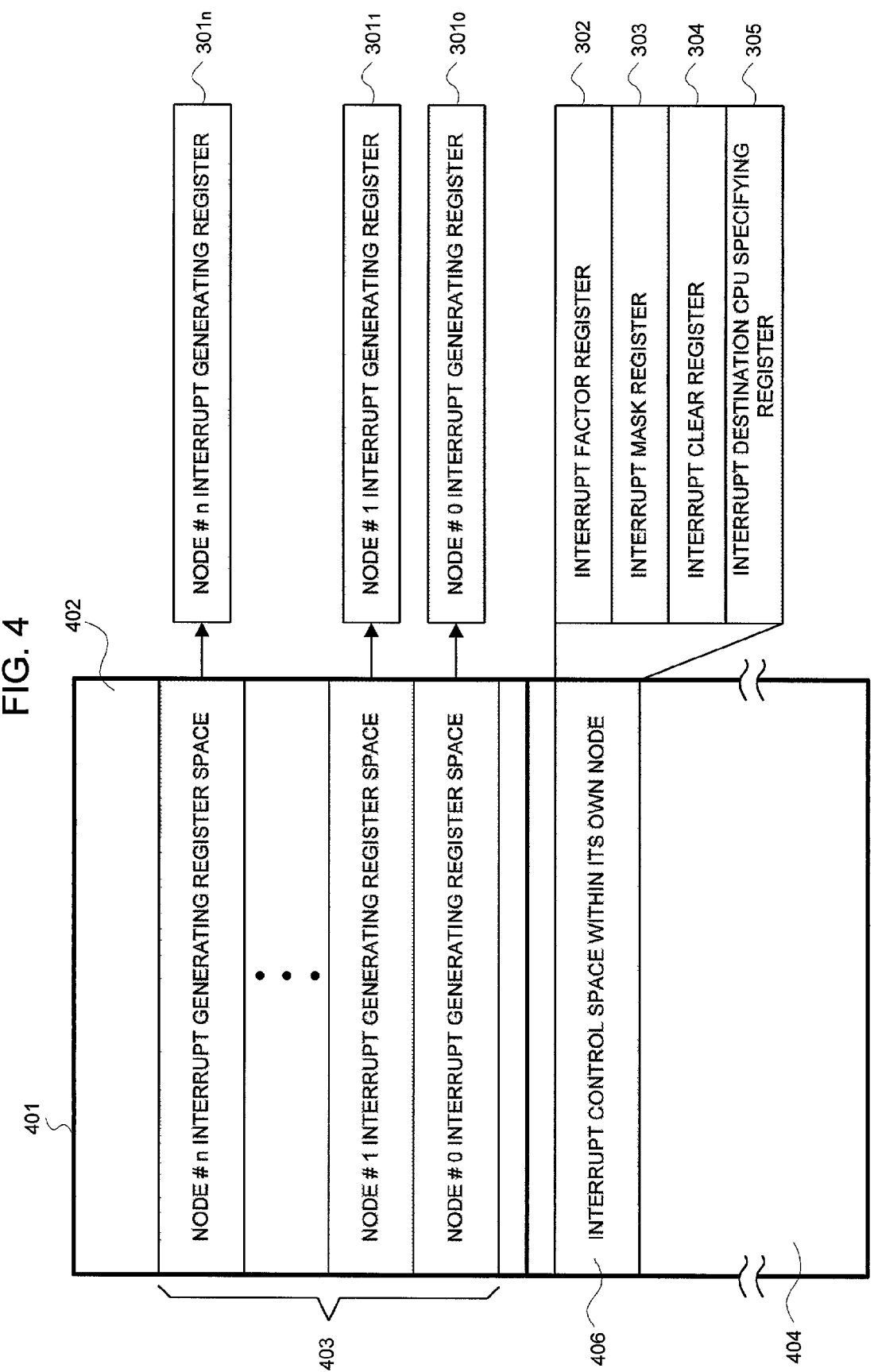
FIG. 4 is a diagram illustrating a memory space for use in an exemplary embodiment of the present invention.

As shown in FIG. 4, each of the registers for interrupt control registers 301 to 305 are mapped in a memory address space 401 of its own node. The CPU of each node is configured to be able to make access to each of the registers 301 to 305 by making access to a space part of the interrupt control registers 301 to 305 in the memory address space 401 within its own node. Additionally, in the nodes 201 and 202, the main memories 209 and 217 and the I/O also are mapped in the memory address space 401 of its own node respectively.

Of the registers for an interrupt control 301 to 305, each of the registers except the interrupt generating register 301 is mapped in a memory address space (local memory address space) 404 for executing the interrupt within its own node, and the CPU of each node is configured to be able to access these registers 302 to 305 by making access to the interrupt control register space 406 part within the memory address space 404 within its own node.

On the other hand, apart from the above-mentioned local memory address space 404, a global memory address space 402 that is common to all nodes is provided. Aside from the interrupt control registers 301 to 305 that exist in each node, interrupt generating registers $301_0$ to $301_n$ are mapped in an interrupt generating register space 403 within the global memory address space 402 that is common to all nodes.

That is, an interrupt issuing region is provided in the global memory space to which the other nodes can make direct access, and together with it, predetermined components (interrupt generating registers $301_1$ to $301_n$) for a plurality of the interrupt issuing destination nodes are related to said interrupt issuing region.

The CPU of a certain node is configured so that, by making access to the interrupt generating register space 403 mapped in the interrupt generating registers $301_1$ to $301_n$ of the other node in its own global space 402, direct access can be made to the interrupt generating register that exists within the above other nodes.

However, in each of inter-node interrupt control registers 301 to 305 mapped in the local memory address space 404 and the global memory space 402 is established access rights (ready for reading/writing, ready for reading, and ready for writing), and originally, in the event that access was made to the registers 301 to 305 to which direct access did not have to be made from the other nodes, it is possible for the interrupt control circuit 220 within the receiving side node to detect access.

In a certain node, in the event that predetermined information instructing the interrupt pre-decided between the nodes was issued to an address of the interrupt generating register 301 of a certain node through the global memory space 403, within the node that actually has the above interrupt generating register 301, the interrupt control circuit 220 receives said predetermined information, generates an interrupt message, and transmits it to a specific CPU inside its own node specified in the interrupt destination CPU specifying register 305 within the interrupt control circuit 220.

Herein, in the interrupt destination CPU specifying register 305, information is pre-established indicating the interrupt destination CPU.

Also, the interrupt mask register 303, which configures access permissible node information memory means for storing information for determining a node that said access permissible node information memory means itself permits to make access, retains the number of the node that is not able to generate the inter-node interrupt for the node having the interrupt mask register 303. Even though the interrupt instructing information addressed to the interrupt generating register 301 was received from the node that was not able to originally generate the interrupt into this node, if the remote interrupt control circuit 220 concluded that the interrupt request was by the node mask-specified in the interrupt mask register 303, the interrupt process is not performed.

When the interrupt factor register 302 receives the interrupt instructing information addressed to the interrupt generating register 301, it records which node the interrupt instructing information was issued from, and offers the interrupt-information to software in the interrupt process. The interrupt clear register 304, which is a register for clearing the interrupt factor register 302, clears the interrupt factor register 302 by raising a flag for the interrupt factor clear register 304.

The interrupt factor register 302, the interrupt mask register 303, the interrupt clear register 304, and the interrupt destination CPU specifying register 305, which are mapped only in the local memory address space 404, are configured so that direct access within its own node is possible, but direct access from other nodes is not possible.

Additionally, the interrupt generating register 301, the interrupt factor register 302, the interrupt mask register 303, the interrupt clear register 304, and the interrupt destination CPU specifying register 305 configure the memory means.

Figure 5:
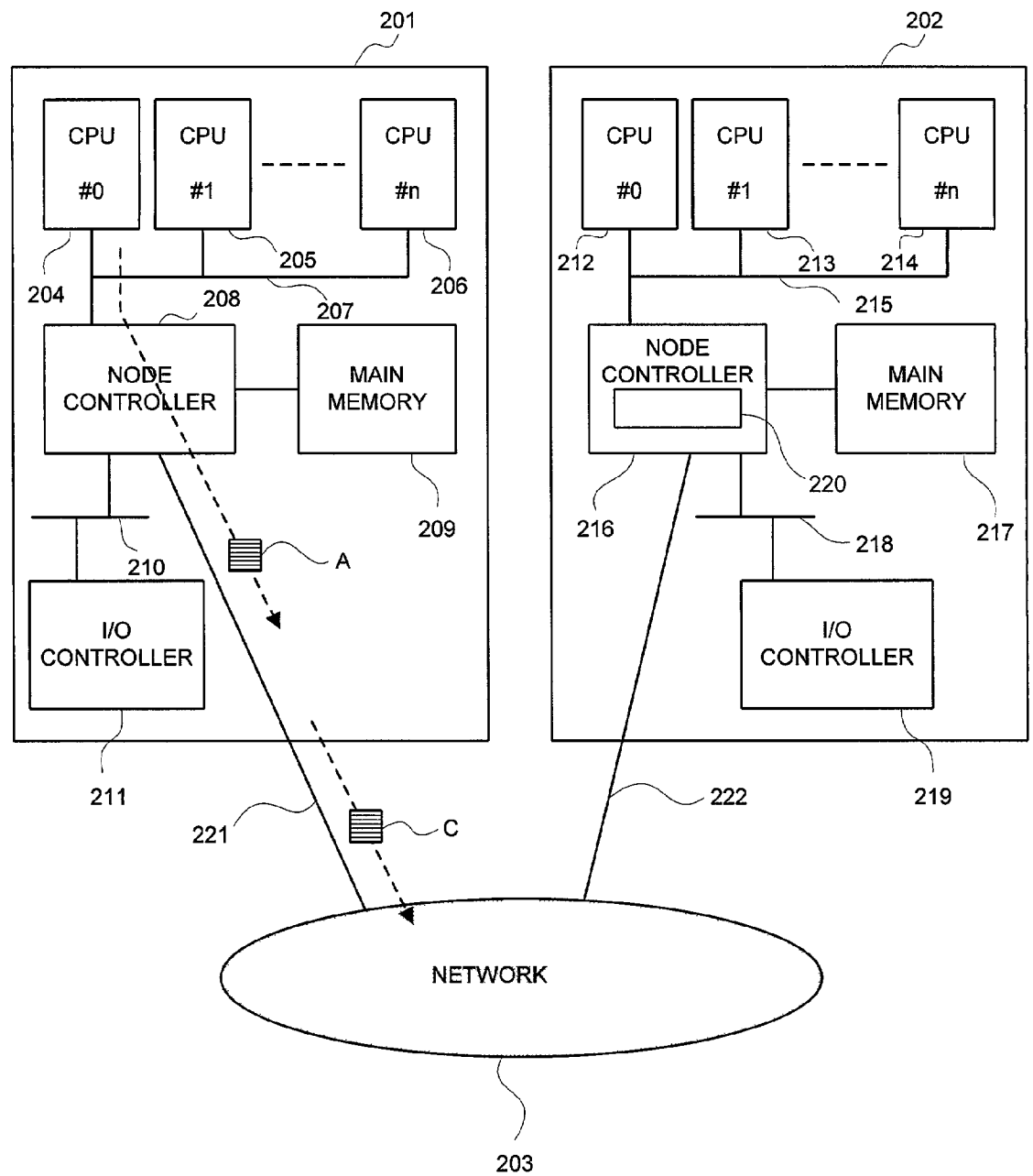
FIG. 5 is a block diagram of the cluster system relating to an exemplary embodiment of the present invention.
Figure 6:
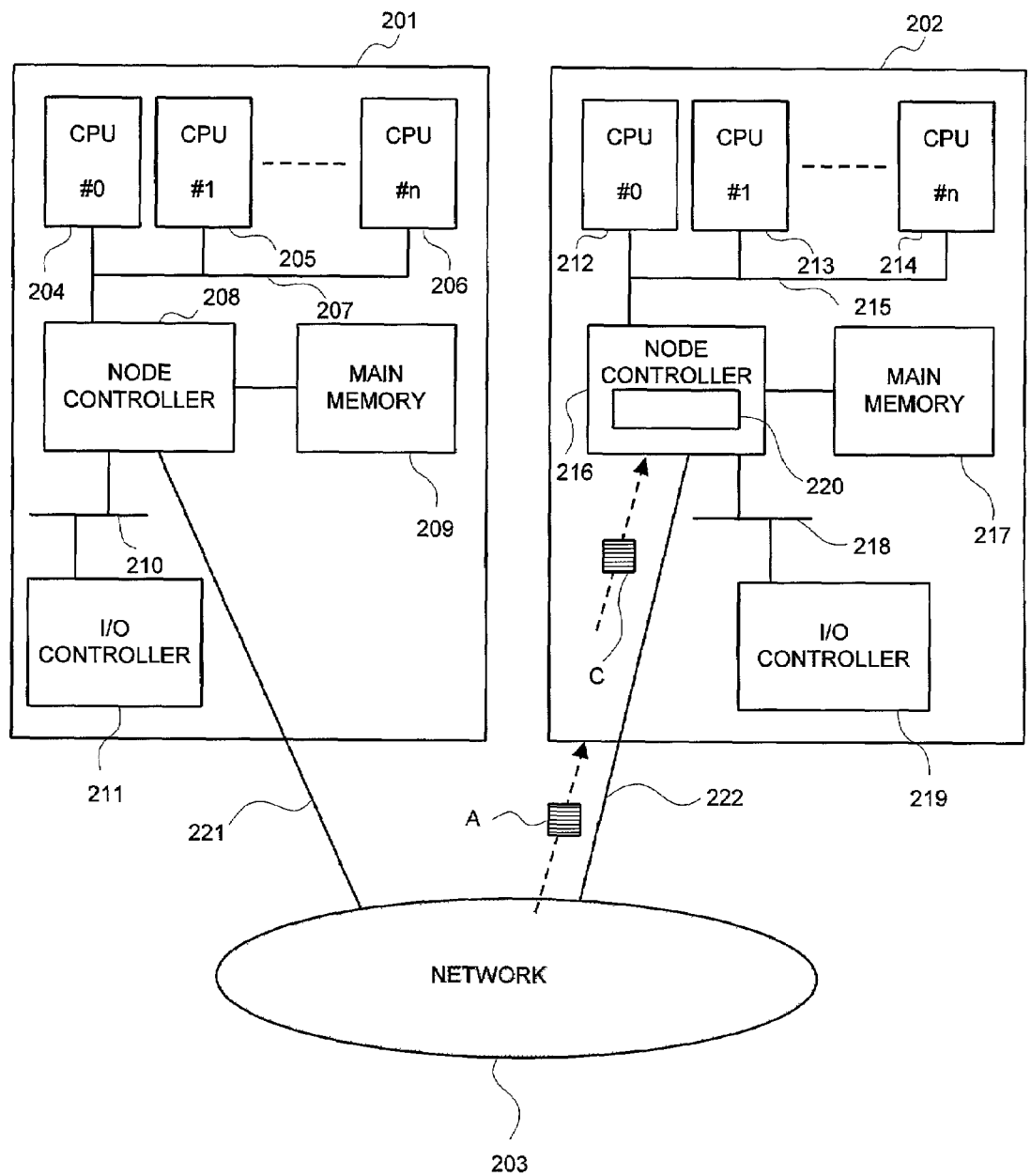
FIG. 6 is a block diagram of the cluster system relating to an exemplary embodiment of the present invention.
Figure 7:
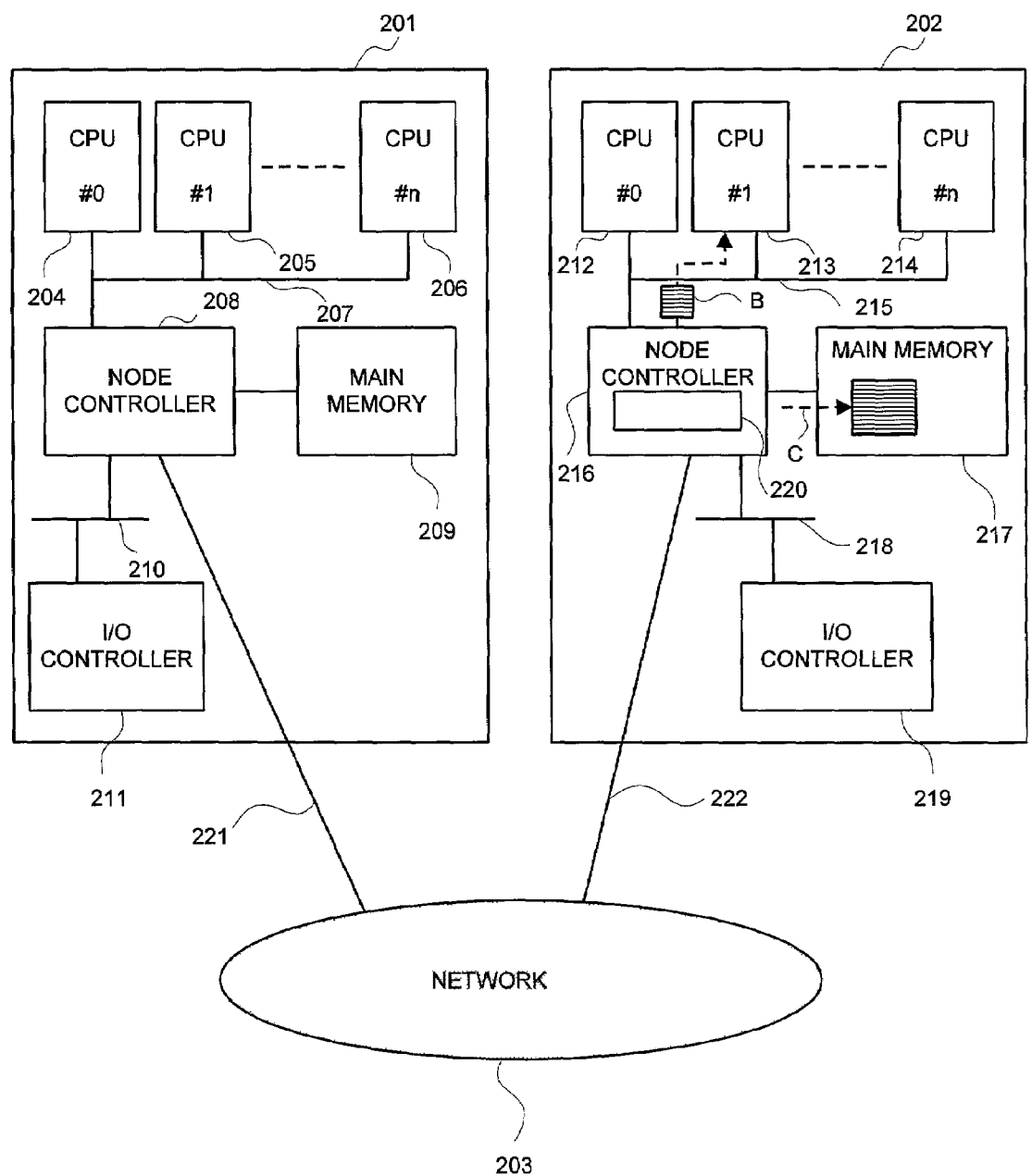
FIG. 7 is a block diagram of the cluster system relating to an exemplary embodiment of the present invention.

FIG. 5 to FIG. 7 are block diagrams for explaining an operation at the moment of issuing the inter-node interrupt.

In general, after data transmission is completed between nodes, the inter-node interrupt is executed so as to notify that the data transmission is complete, and hence, in examples of FIG. 5 to FIG. 7, as an example of the case in which the inter-node interrupt is executed, the case is exemplified in that, after completion of the data transfer between the nodes, the data transfer completion is notified to the data receiving node to execute the interrupt. Additionally, in FIG. 5 to FIG. 7, the same reference numbers are used for part similar to those shown in FIG. 2.

Figure 8:
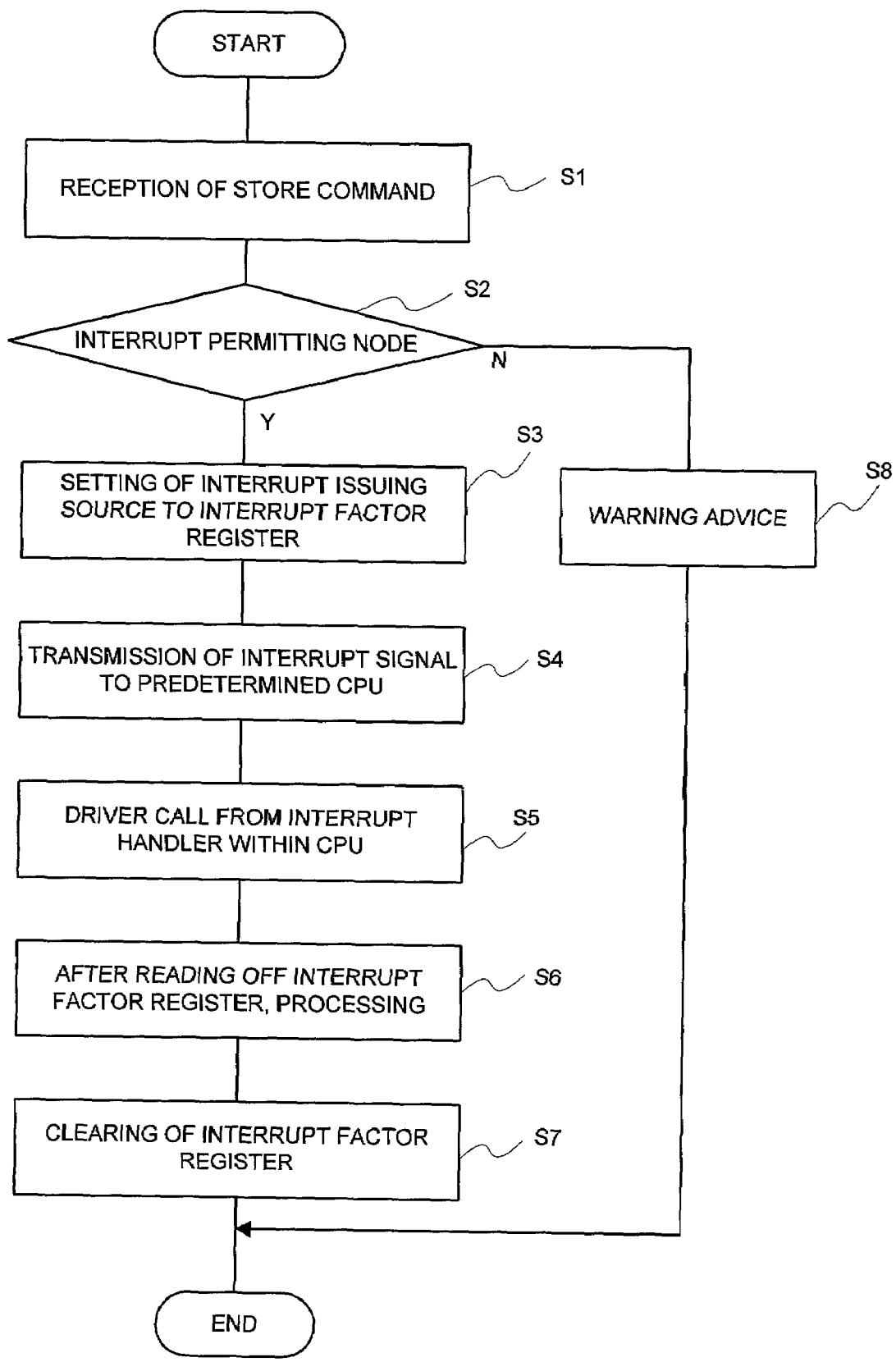
FIG. 8 is a flowchart illustrating the process of the cluster system relating to another exemplary embodiment of the present invention.

Also, FIG. 8 is a flowchart illustrating the interrupt process in the interrupt issuing destination node.

Figure 9:
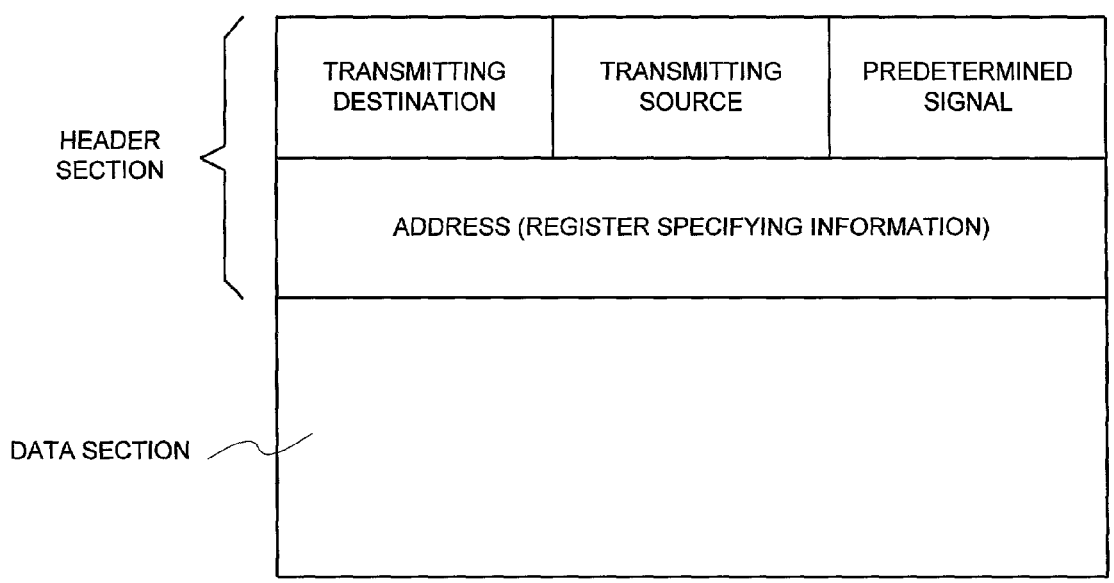
FIG. 9 is a diagram illustrating a packet for use in the cluster system relating to another exemplary embodiment of the present invention.

Also, FIG. 9 is a diagram illustrating a configuration of an interrupt instructing signal to be transmitted to the interrupt issuing destination node from the issuing source node so as to issue the inter-node interrupt. In FIG. 9, said interrupt instructing signal, which is configured of packets, comprises a header section including the interrupt issuing destination node, the interrupt issuing source node, predetermined information indicating the interrupt instruction (the store command in this exemplary embodiment), and the address for specifying the interrupt generating register of the interrupt issuing destination node, and data section. Data is not required in the data section; however dummy data may be included, depending upon a format of the packet.

Explanation will be made below for the operation for generating the inter-node interrupt at the center, using FIG. 5 to FIG. 9, or by referring to FIG. 3 and FIG. 4.

At first, in FIG. 5, explanation is made for, on the assumption that after the node 201 completes data transfer to the node 202, the inter-node interrupt is transmitted to the node 202 from the node 201. That is, this is an example that the node 201 functions as the interrupt issuing source node, and the node 202 functions as the interrupt issuing destination node (target node).

In this case, in the node 201, after completion of transmission of data C to the node 202, predetermined information (e.g. store command) is issued to its own interrupt issuing region related to the predetermined component for the node 202. For example, the CPU 204 issues a store command A for the interrupt issuing region (e.g. node # n interrupt generating register space $301_n$ of the remote interrupt control register space 403) in which was mapped the predetermined component (a certain interrupt generating register 301) for the node 202 in the global memory space 402 to which said CPU itself can make access.

The store command A is sent to the network 203 via the inter-node connection bus 221 in a packet format of FIG. 9 by an interrupt control circuit (not shown) of the node controller 208. The store command A sent to the network 203 is received in the interrupt control circuit 220 of the node 202 via the inter-node connection bus 222 (See FIG. 6).

At this moment, by hardware control, a signal to be transferred over the network is guaranteed to pass through one path, thereby a signal transmitted later is adapted not to go ahead of a signal transmitted earlier. That is, the configuration is made so that data C to the node 202 from the node 201, which precedes the store command A to the interrupt generating register 301 over the network 203, is not permitted to be outpaced by the above store command A, and ordering of the data C over the path ranging from the node controller 208 of the node 201 through the network 203 to the interrupt generating register 301 within the node controller 216 of the node 202, and the store command A to the interrupt generating register 301 are all guaranteed by the hardware over the path.

The interrupt control circuit 220 receives the data C from the node 201 and stores it in the main memory 217 (see FIG. 7).

After the interrupt control circuit 220 stores the data C from the node 201 in the main memory 217, and upon receiving the store command A for the interrupt generating register 301 of its own node, which was received from the node 201 (step S1 of FIG. 8), it refers to the interrupt mask register 303 is referred to, and the node 201 is checked whether it has an inter-node interrupt generating right of the node 202 (step S2).

If the node 201 is specified by the interrupt mask register 303 as a node that does not have a right for generating the interrupt for the node 202, a warning that access was received from a node that was not permitted to make access is notified to the predetermined CPU within the node 202 (step S8), and the received data A is annulled to finish the process.

In the step S2, in the event that, by referring to the mask register 304 of the node 202, the interrupt control circuit 220 concludes that the node 201 was permitted to generate the interrupt for the node 202, it retains source information on an inter-node interrupt request (information associated with the node 201) in the interrupt factor register 302 (step S3), and transmits an interrupt signal B for the CPU specified in the interrupt destination CPU specifying register 305 within the interrupt control circuit 220 (see step S4 and FIG. 7).

In this case, assuming that the CPU 213 was specified in the interrupt destination CPU specifying register 305, when the CPU 213 receives an interrupt signal B, a driver is called up from an interrupt handler (step S5) within the CPU 213. By referring to the interrupt factor register 302, said driver determines which node the interrupt was received from, and performs the corresponding process (step S6). After the CPU 213 completes the interrupt process, by raising a flag for the interrupt factor clear register 304, it clears the interrupt factor register 302. In the process above, the interrupt between nodes is executed.

Figure 10:
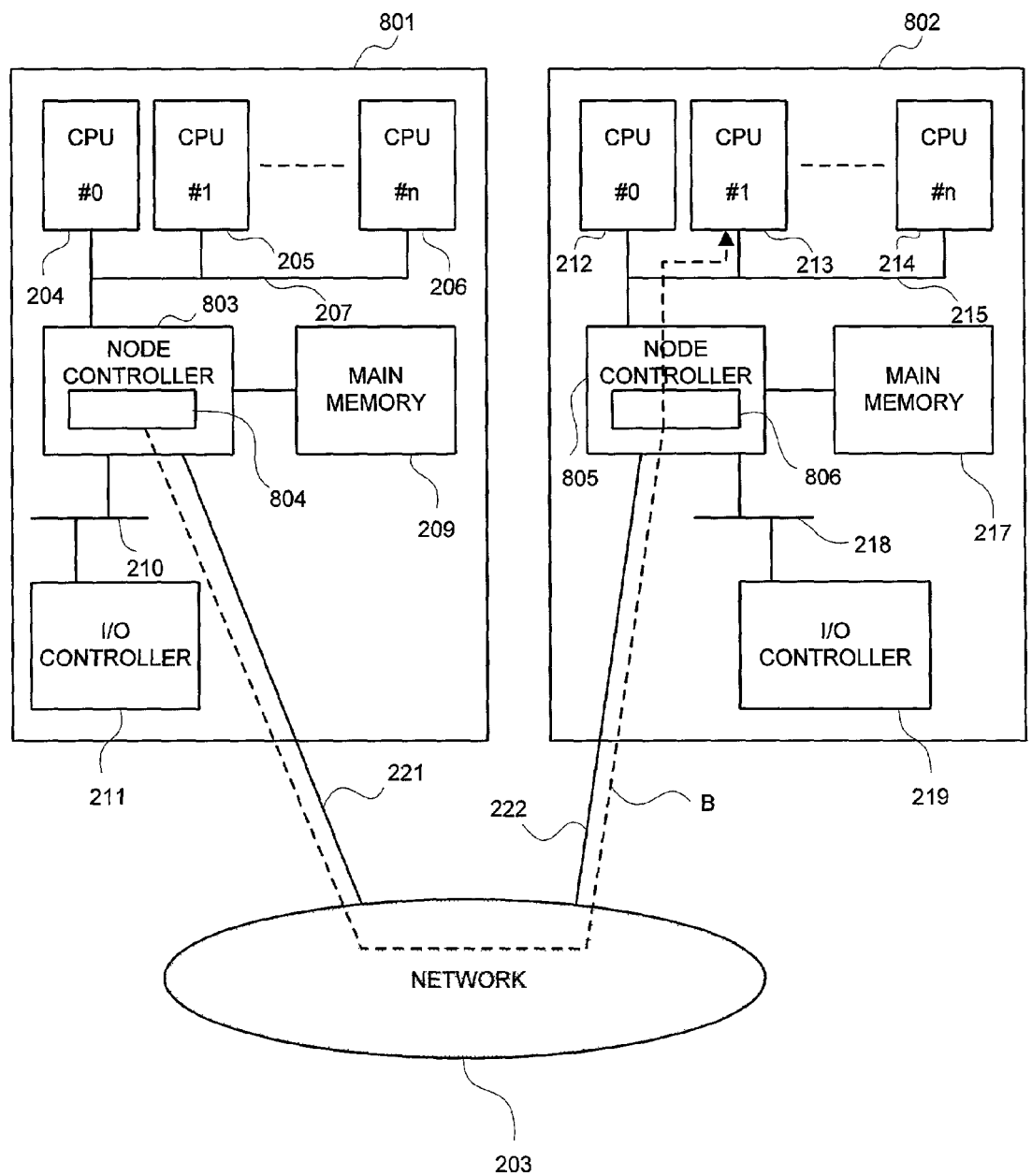
FIG. 10 is a block diagram of the cluster system relating to another exemplary embodiment of the present invention.

FIG. 10 is a block diagram of another exemplary embodiment relating to the present invention, and the same reference numbers are used for parts similar to those shown in FIG. 2.

The exemplary embodiment shown in FIG. 10 illustrates a system in which a plurality of registers for issuing the inter-node interrupt exist within node controllers 803 and 805 in an interrupt issuing source node 801 and an interrupt issuing destination node 802 respectively.

That is, by connecting the interrupt issuing source node 801 and the interrupt issuing destination node 802 via the network 203, the cluster system is configured. An interrupt control circuit 804 is provided within the node controller 803, and together with it, an interrupt control circuit 806 is provided within the node controller 805. Interrupt control circuits 804 and 806 are provided with a plurality of the registers for issuing the inter-node interrupt respectively.

Figure 11:
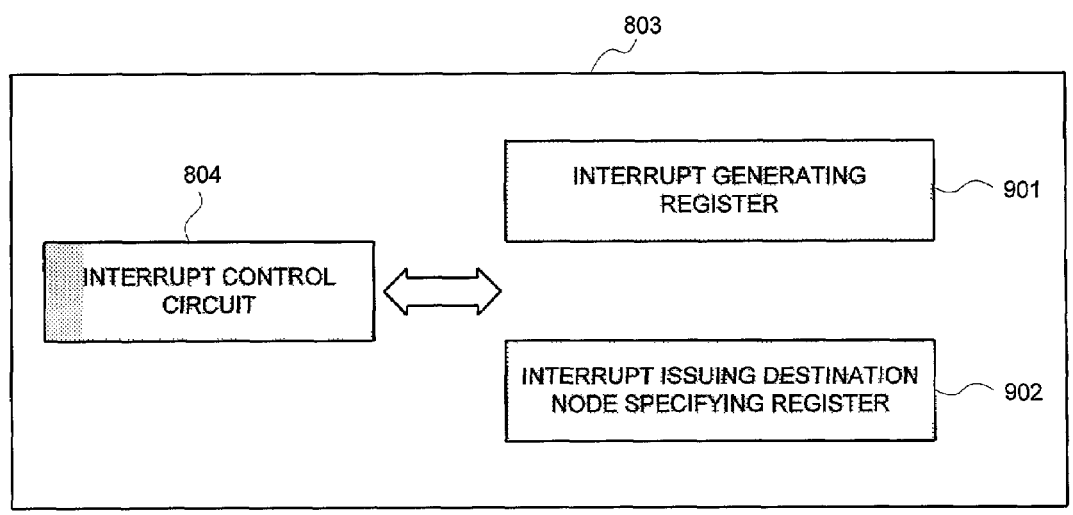
FIG. 11 is a diagram illustrating a register configuration for use in an exemplary embodiment of the present invention.

As shown in FIG. 11, the interrupt control circuit 804 is provided in the node controller 803 of the interrupt issuing source node 801. Additionally, an interrupt generating register 901 and an interrupt issuing destination node specifying register 902 are provided as registers for the interrupt issue. The interrupt control circuit 804 controls the interrupt generating register 901 and the interrupt issuing destination node specifying register 902.

Figure 12:
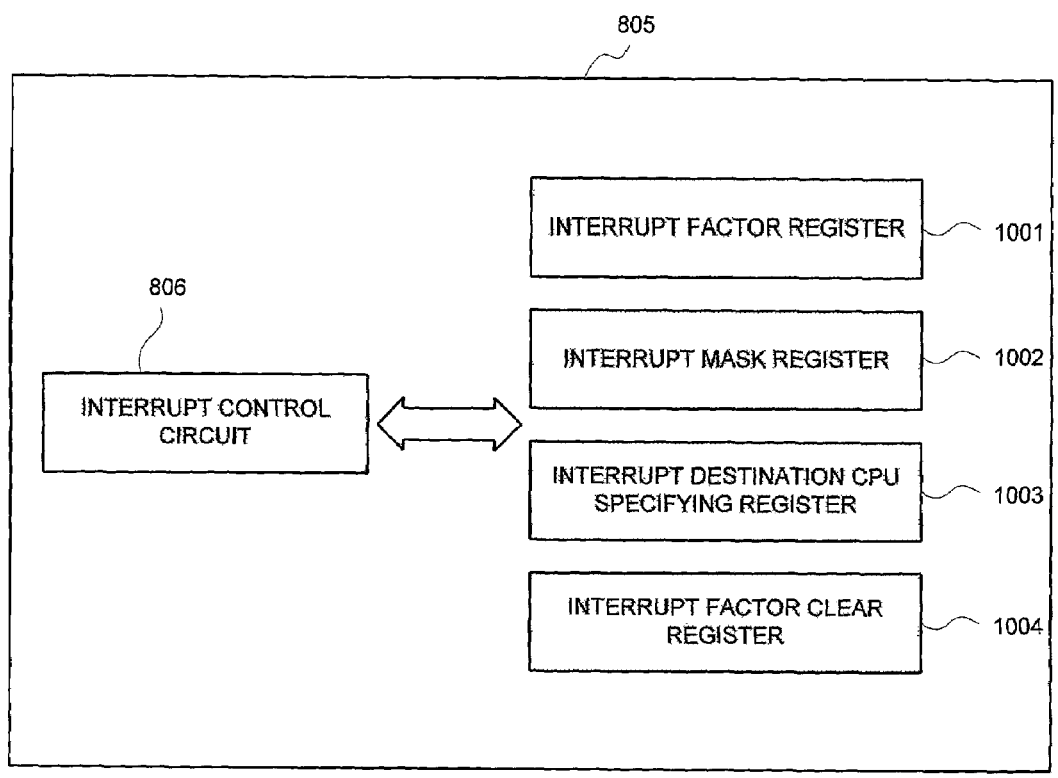
FIG. 12 is a diagram illustrating a register configuration for use in another exemplary embodiment of the present invention.

Also, as shown in FIG. 12, the interrupt control circuit 806 is provided in the node controller 805 of the interrupt issuing destination node 802. Additionally, an interrupt factor register 1001, an interrupt mask register 1002, an interrupt destination CPU specifying register 1003 and an interrupt factor clear register 1004 are provided. The interrupt control circuit 805 controls these registers 1001 to 1004.

Additionally, the node 801 and the node 802 are configured identically; however for explanation reasons, since the node 801 functions as the interrupt issuing source node, as to the control circuit 804 thereof, a part associated with the function of the interrupt issuing source is illustrated, and since the node 802 functions as the interrupt issuing destination node, as to the control circuit 806 thereof, a part associated with the function of the interrupt issuing destination is illustrated.

Herein, the interrupt generating register 901 is a register for giving an opportunity for actually issuing the interrupt. The interrupt issuing destination node specifying register 902 is a register for specifying the node number of the interrupt issuing destination. The interrupt mask register 1002, which is a register for specifying which node is permitted for the interrupt, is a register to be established by a low-level program such as firmware so that the interrupt from a wrong node is not executed by an application. The interrupt factor register 1001, the interrupt destination CPU specifying register 1003 and the interrupt factor clear register 1004 are registers having an identical function to that of each register in the foregoing exemplary embodiment.

Figure 13:
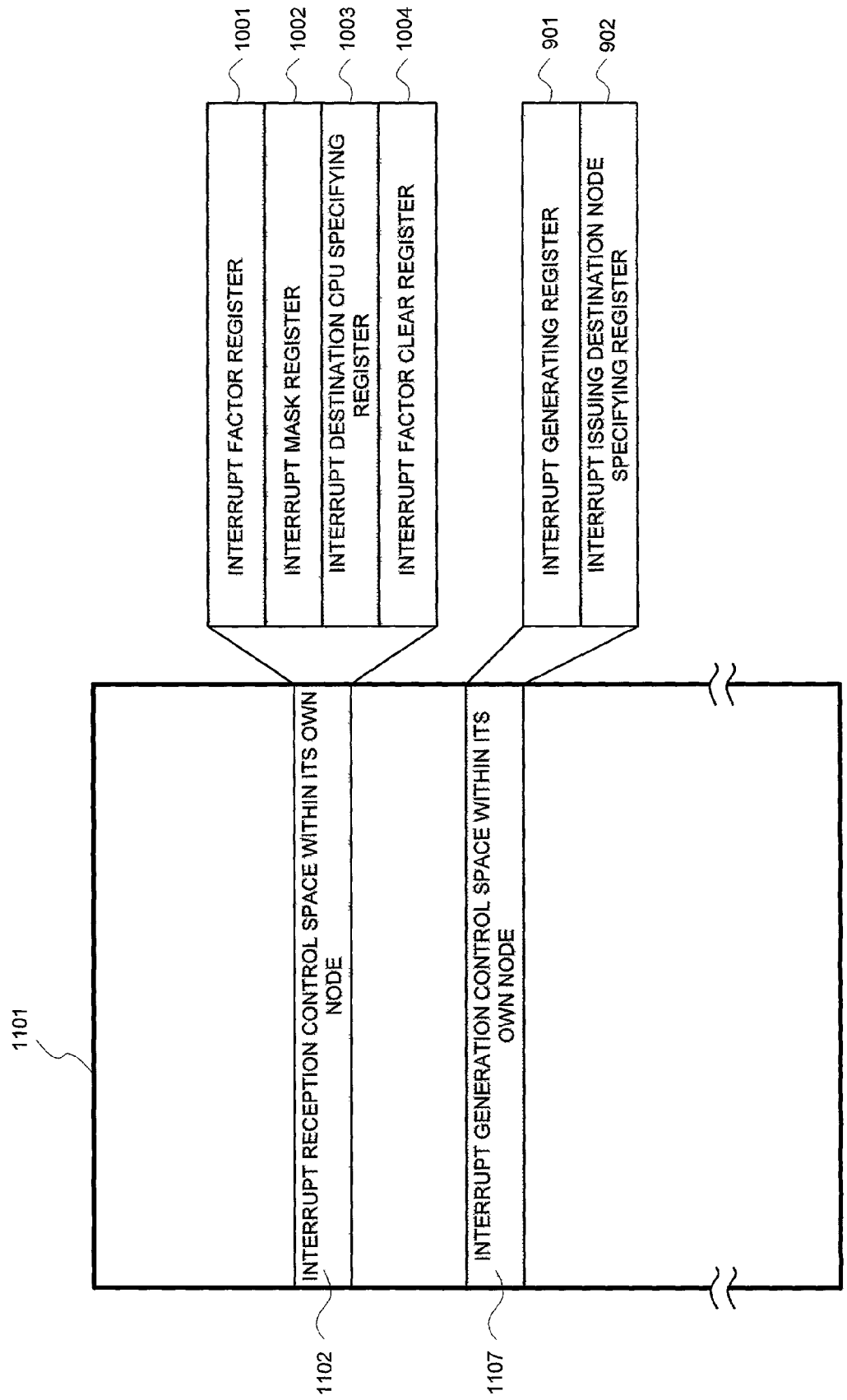
FIG. 13 is a diagram illustrating a memory space for use in another exemplary embodiment of the present invention.
Figure 14:
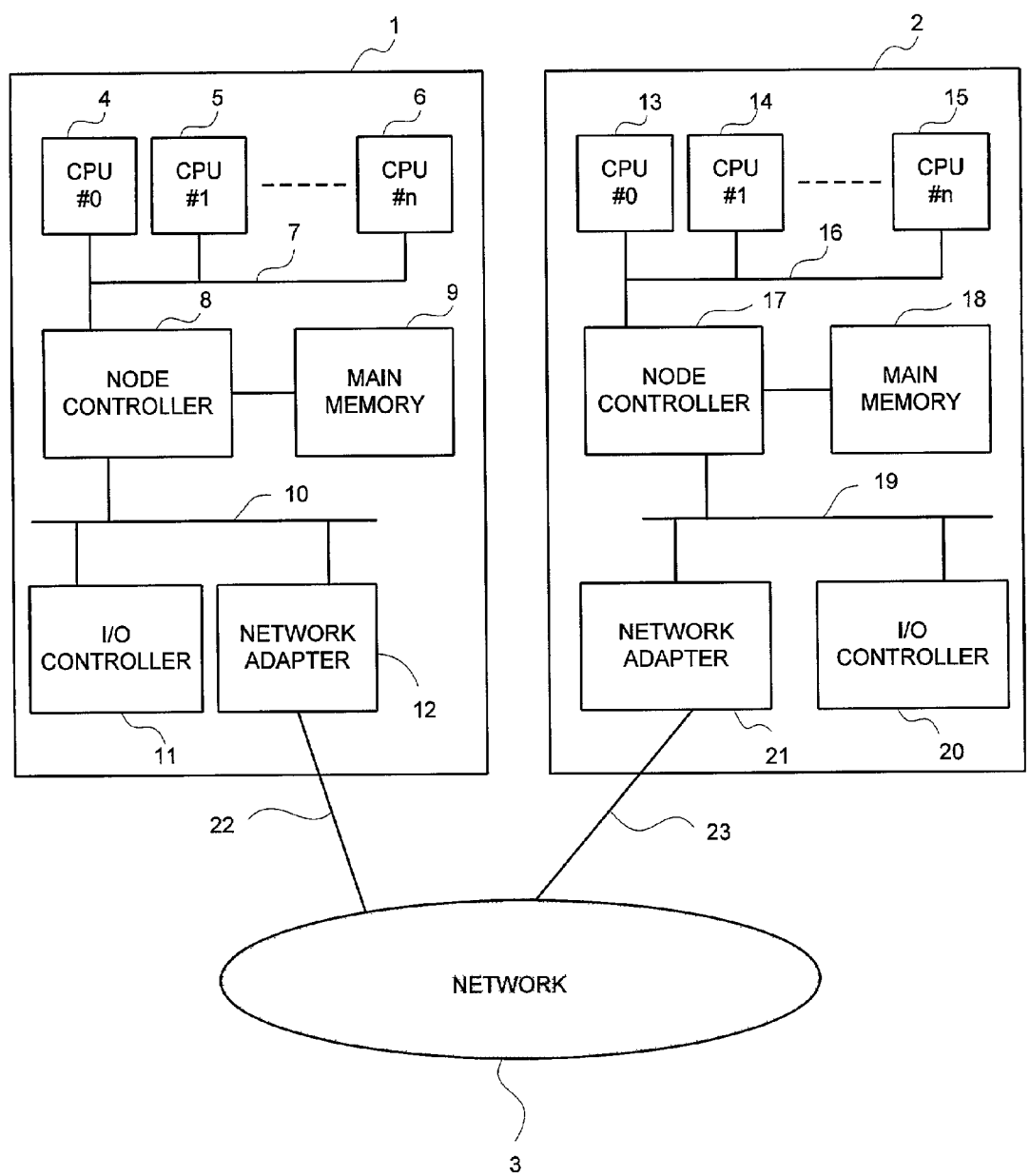
FIG. 14 is a block diagram illustrating the conventional cluster system.
Figure 15:
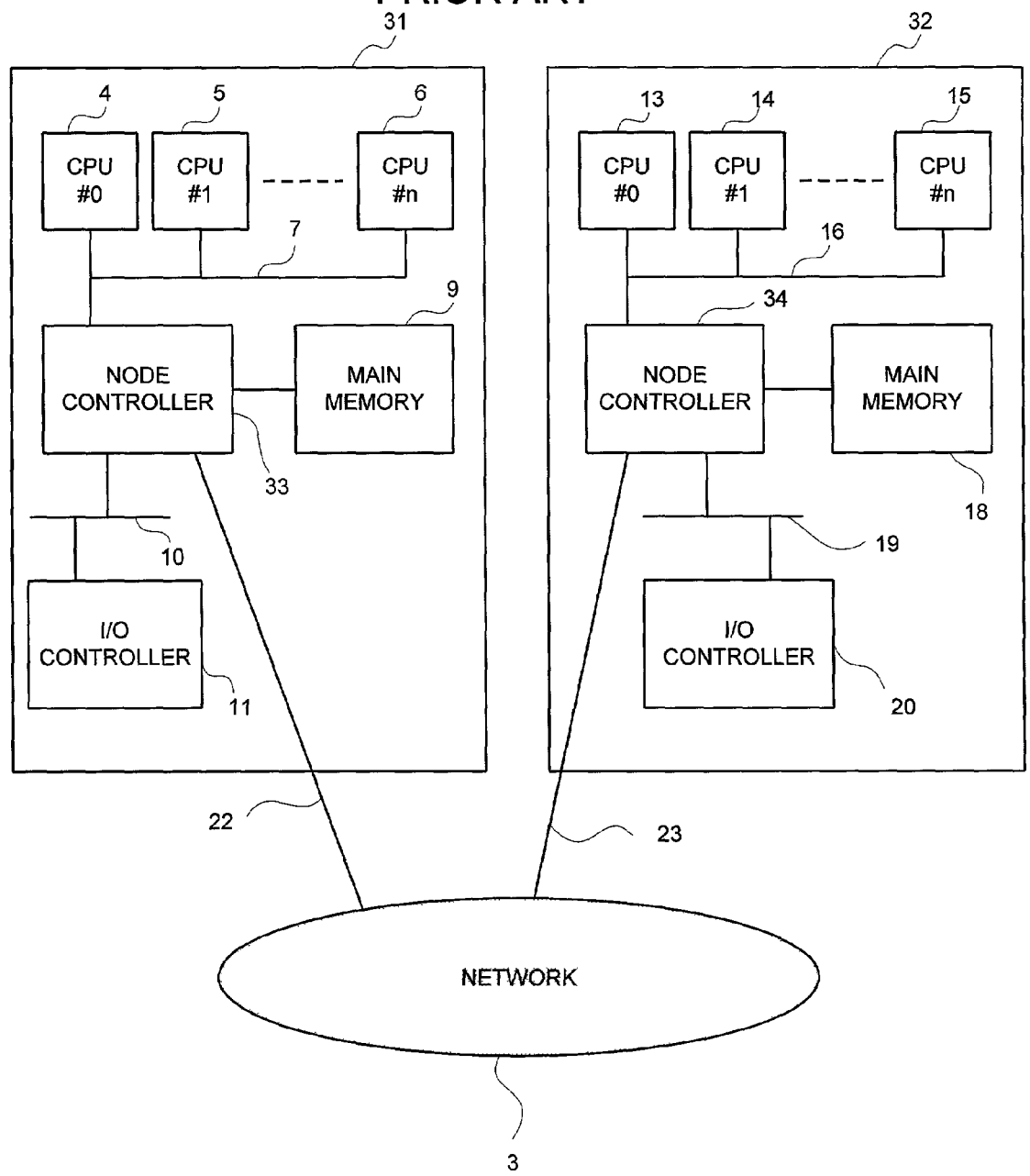
FIG. 15 is a block diagram illustrating the conventional cluster system.

Also, these registers 901 and 902, and 1001 to 1004 are mapped in a local memory address space 1101 in each of the nodes 801 and 802 as shown in FIG. 13, to which access is made. That is, the interrupt issuing region is provided in the local memory address space 1101 to which only its own node can make direct access, and together with it, is configured of an interrupt issuing destination node specifying region for specifying the interrupt issuing destination node, and an interrupt generating region for issuing said predetermined information.

In this case, the interrupt control register is not required to be mapped in the global memory address memory space like a system in FIG. 2, the access from the other nodes is all prohibited, and yet the mapping is all executed into the local memory space 1101 to which only its own node can make direct access.

In the event of issuing the interrupt from the node 801 to the node 802, in the node 801, for example, the CPU 204 issues a write command of information specifying the node 802 for the interrupt issuing destination node specifying register 902 in the local memory space 1101, and next issues the write command of predetermined information (e.g. the store command) for the interrupt generating register 901.

The store command is sent to the network 203 via the inter-node connection bus 221 in a packet format of FIG. 9 by the interrupt control circuit 804 of the node controller 803. The store command sent to the network 203 is received in the interrupt control circuit 806 of the node 802 via the inter-node connection bus 222, and hereinafter, a process similar to that of the exemplary embodiment is performed in the node 802.

That is, the interrupt control circuit 806 refers to the interrupt mask register 1002, only in the event that the node 801 has an interrupt generating right for its own node 802, retains source information (information associated with the node 801) on an inter-node interrupt request in the interrupt factor register 1001, and yet transmits an interrupt signal to a predetermined CPU pre-specified in the interrupt destination CPU specifying register 1003. After the CPU completes the interrupt process, by raising a flag for the interrupt factor clear register 1004, it clears the interrupt factor register 1001. In the above process, the interrupt between the nodes is performed.

In such a manner, in the interrupt issuing source node also in cases where a similar inter-node interrupt control register group was mounted, similar to the case of FIG. 2, the predetermined information (e.g. a store command), which the CPU 204 to 206, and 212 to 214 of each of the nodes 801 and 802 issue, enables the interrupt for the other nodes to be issued.

In this case, the registers 901, 902 and 1001 to 1004 provided in each node are mapped in the local memory space 1101 to which the other nodes are not able to make direct access, but only its own node is able to make direct access, whereby security is improved.

But, different from the case of the exemplary embodiment shown in FIG. 2, after specification by first issuing the write command for the interrupt issuing destination node specifying register 902 of the interrupt issuing destination node, the write command for actually issuing the interrupt is issued to the node interrupt generating register 901, whereby the write command needs to be issued twice to the registers so as to issue one inter-node interrupt. The system of FIG. 2 is superior in terms of latency.

As described above, the cluster system relating to the exemplary embodiments of the present invention comprises: an interrupt issuing source node for, in particular, by relating the predetermined component (e.g. the interrupt issuing register) for the interrupt issuing destination node to the interrupt issuing region in its own memory address spaces 402 and 1101 to issue predetermined information (e.g. the store command) to said interrupt issuing region, transmitting said predetermined information to an address of said predetermined component for said interrupt issuing destination node; and an interrupt issuing destination node having control means for, by receiving said predetermined information addressed to said predetermined component to transmit the interrupt command to a CPU within its own node, causing said CPU to generate the interrupt.

Also, the cluster system relating to the exemplary embodiments of the present invention, in which a plurality of the nodes connected to the network operate cooperatively, is characterized in comprising the interrupt issuing source node having a CPU and first control means in which, by relating the predetermined component (e.g. the interrupt issuing register) for the interrupt issuing destination node to the interrupt issuing region in its own memory address spaces 402 and 1101, said CPU issues the write command of predetermined information (e.g. the store command) for said interrupt issuing region to said first control means, and thereby said control means transmits said predetermined information to an address of said predetermined component for said interrupt issuing destination node; and an interrupt issuing destination node having second control means for, by receiving said predetermined information addressed to said predetermined component to transmit the interrupt command to a CPU within its own node, causing said CPU to generate the interrupt. Accordingly, it becomes possible to make interrupt transfer between nodes with low latency, and also it becomes possible to reduce overhead caused by the interrupt.

Also, the cluster system is configured so that: said interrupt issuing destination node has the mask register 303 in which was pre-established information for determining a node which said interrupt issuing destination node itself permits to make access; and when the control circuit received said predetermined information, it refers to the information established in the mask register 303, and in the event of a node that is permitted to make access by the interrupt source node which transmitted said predetermined information, transmits said interrupt command, whereby it becomes possible to improve security.

The computer relating to the exemplary embodiments of the present invention is configured so that, in particular, by relating a predetermined component for an interrupt issuing destination node to an interrupt issuing region in its own memory space to issue predetermined information to said interrupt issuing region, said predetermined information is transmitted to an address of said predetermined component for said interrupt issuing destination node. Also, the computer relating to the exemplary embodiments of the present invention is configured so that, by relating a predetermined component for an interrupt issuing destination node to an interrupt issuing region in its own memory space to issue predetermined information to said interrupt issuing region, said predetermined information is transmitted to an address of said predetermined component for said interrupt issuing destination node. Also, the computer relating to the exemplary embodiments of the present invention including a CPU and control means is characterized in being configured so that: the predetermined component for the interrupt issuing destination node is related to the interrupt issuing region in its own memory space; and said CPU issues the write command of predetermined information for said interrupt issuing region, thereby transmitting said predetermined information to an address of said predetermined component for said interrupt issuing destination node. Accordingly, it becomes possible to construct the cluster system in which the interrupt transfer can be executed between nodes with low latency, and also it becomes possible to construct the cluster system in which the overhead caused by the interrupt was reduced.

Also, the computer relating to the exemplary embodiments of the present invention including: control means for, by receiving predetermined information addressed to the predetermined component for its own to transmit the interrupt command to its own CPU, causing said CPU to generate the interrupt; and access permissible node information memory means for storing information for determining a node that said access permissible node information memory means itself permits to make access, is configured so that, when said control means received said predetermined information, it refers to said access permissible node information memory means, and in the event of a node that is permitted to make access by the interrupt issuing source node which transmitted said predetermined information, transmits said interrupt command. Accordingly, it becomes possible to construct a cluster system having high security.

The program relating to the exemplary embodiments of the present invention is configured to cause the computer to function so that, in particular, by relating the predetermined component for the interrupt issuing destination node to the interrupt issuing region in its own memory space to issue predetermined information to said interrupt issuing region, said predetermined information is transmitted to an address of said predetermined component for said interrupt issuing destination node. Also, the program relating to the exemplary embodiments of the present invention is characterized in being configured to cause the computer having a CPU and control means to function so that: the predetermined component for the interrupt issuing destination node is related to the interrupt issuing region in its own memory space; and said CPU issues the write command of predetermined information for said interrupt issuing region to said control means; and thereby said control means transmits said predetermined information to an address of said predetermined component for said interrupt issuing destination node. Accordingly, it becomes possible to construct the cluster system in which the interrupt transfer can be executed between nodes with low latency, and also it becomes possible to construct the cluster system in which the overhead caused by the interrupt was reduced.

Also, the program relating to the exemplary embodiments of the present invention is configured so as to cause the computer to function as the control means for, in having received predetermined information, by referring to the access permissible node information memory means for storing information for determining a node that the computer itself permits to make access, in the event of a node that is permitted to make access by the interrupt issuing source node which transmitted said predetermined information, to transmit the interrupt command to its own CPU, causing said CPU to generate the interrupt. Accordingly, it becomes possible to construct a cluster system having high security.

Additionally, the predetermined information should be one pre-decided between the nodes as information indicating the interrupt instruction, and the predetermined commands, for example, the predetermined commands dedicated to memory access such as a load command, the write command, and a read command also can be used.

In accordance with the present invention, it becomes possible to execute the interrupt transfer between the computers with low latency.

Also, it becomes possible to reduce the overhead caused by the interrupt.

Also, it becomes possible to realize improvement of security.

What is claimed is:

1. A cluster system in which a plurality of nodes connected to a network operate cooperatively, comprising:
   an interrupt issuing source node which transmits predetermined information to an address of a predetermined component; and
   an interrupt issuing destination node having said predetermined component and a control means for causing a CPU within said interrupt issuing destination node to generate an interrupt;
   wherein said interrupt issuing source node relates said predetermined component of said interrupt issuing destination node to an interrupt issuing region in a memory space of said interrupt issuing source node to issue said predetermined information to said interrupt issuing region, and said interrupt issuing destination node receives said predetermined information addressed to said predetermined component to transmit an interrupt command to said CPU.

2. The cluster system according to claim 1, characterized in that said predetermined component comprises a memory means.

3. The cluster system according to claim 2,
   wherein said memory means includes an interrupt generating register related to said interrupt issuing region in said memory space, and an interrupt destination CPU specifying register in which information is established for indicating an interrupt destination CPU;
   said interrupt issuing source node transmits said predetermined information to an address of said interrupt generating register by issuing said predetermined information to said interrupt issuing region; and
   said control means of said interrupt issuing destination node receives said predetermined information issued to an address of said interrupt generating register, and transmits said interrupt command to the CPU established as said interrupt destination CPU specifying register.

4. The cluster system according to claim 3,
   wherein said memory means further includes an interrupt mask register in which information is established for determining a node that said memory means permits access to; and
   said control means of said interrupt issuing destination node transmits said interrupt command when said predetermined information is received, and wherein information established in said interrupt mask register is referred to in the event that a node is permitted access by said interrupt issuing source node.

5. The cluster system according to claim 4,
   wherein said memory means further includes an interrupt factor register for storing information on said interrupt issuing source node;
   said control means of said interrupt issuing destination node stores said information on said interrupt issuing source node in said interrupt factor register when said predetermined information is received; and
   said CPU performs an interrupt process by referring to information on said interrupt issuing source node stored in said interrupt factor register.

6. The cluster system according to claim 1, wherein said interrupt issuing destination node has access permissible node information memory means for storing information for determining a node that said access permissible node information memory means permits access to; and
   said control means transmits said interrupt command when said predetermined information is received, and wherein said access permissible node information memory means is referred to in the event that a node is permitted access by said interrupt issuing source node which transmitted said predetermined information.

7. The cluster system according to claim 6, wherein said access permissible node information memory means is configured from an interrupt mask register in which information is established for determining a node that said access permissible node information memory means permits access to.

8. The cluster system according to claim 1,
   wherein said interrupt issuing region is provided in a global memory space to which the plurality of nodes can make direct access, and said interrupt issuing region is related to predetermined components of a plurality of interrupt issuing destination nodes; and
   said interrupt issuing source node transmits said predetermined information to an address of said predetermined component of corresponding said interrupt issuing destination node by issuing said predetermined information to said interrupt issuing region related to said predetermined component of said interrupt issuing destination node.

9. The cluster system according to claim 1,
   wherein said interrupt issuing region is provided in a local memory space to which only said interrupt issuing source node can make direct access, and is configured from an interrupt issuing destination node specifying region for specifying said interrupt issuing destination node and an interrupt generating region for issuing said predetermined information; and
   wherein said interrupt issuing source node transmits said predetermined information to said specified interrupt issuing destination node by issuing said predetermined signal to said interrupt generating region, after said interrupt issuing destination node is specified as said interrupt issuing destination node specifying region.

10. A computer which transmits predetermined information to an address of a predetermined component for an interrupt issuing destination node, wherein said predetermined component for said interrupt issuing destination node is related to an interrupt issuing region in a memory space of the computer, and predetermined information is issued to said interrupt issuing region.

11. The computer according to claim 10, wherein said predetermined component comprises a memory means.

12. The computer according to claim 10,
wherein said interrupt issuing region is provided in a global memory space to which other nodes can make direct access, and said interrupt issuing region is related to predetermined components of a plurality of interrupt issuing destination nodes; and
said predetermined information is transmitted to an address of said predetermined component of corresponding said interrupt issuing destination node by issuing said predetermined information to said interrupt issuing region related to said predetermined component of said interrupt issuing destination node.

13. The computer according to claim 10,
wherein said interrupt issuing region is provided in a local memory space to which only the computer can make direct access, and is configured from an interrupt issuing destination node specifying region for specifying said interrupt issuing destination node and an interrupt generating region for issuing said predetermined information; and
wherein said predetermined information is transmitted to said specified interrupt issuing destination node by issuing said predetermined information to said interrupt generating region, after said interrupt issuing destination node is specified as said interrupt issuing destination node specifying region.

14. A computer comprising:
control means for causing a CPU of the computer to generate an interrupt, said control means receiving predetermined information addressed to a predetermined component within said control means to transmit an interrupt command to said CPU; and
access permissible node information memory means for storing information for determining a node that said control means permits access to, wherein said control means transmits said interrupt command when said predetermined information is received, and wherein said access permissible node information memory means is referred to in the event that a node is permitted access by an interrupt issuing source node which transmitted said predetermined information.

15. The computer according to claim 14, wherein said predetermined component comprises a memory means.

16. The computer according to claim 15,
wherein said memory means includes an interrupt generating register related to an interrupt issuing region in a memory space of an interrupt issuing source node, and an interrupt destination CPU specifying register in which information is established for indicating an interrupt destination CPU; and
said control means receives said predetermined information issued to an address of said interrupt generating register, and transmits said interrupt command to the CPU established as said interrupt destination CPU specifying register.

17. The computer according to claim 15,
wherein said memory means further includes an interrupt factor register for storing information on an interrupt issuing source node;
said control means stores said information on said interrupt issuing source node in said interrupt factor register when said predetermined information is received; and
said CPU performs an interrupt process by referring to information on said interrupt issuing source node stored in said interrupt factor register.

18. The computer according to claim 14, wherein said access permissible node information memory means is configured from an interrupt mask register in which information is established for determining a node that said access permissible node information memory means permits access to.

19. A program embodied in a computer-readable media which causes a computer to function so as to transmit predetermined information to an address of a predetermined component for an interrupt issuing destination node, wherein said predetermined component for said interrupt issuing destination node is related to an interrupt issuing region in a memory space of the program, and predetermined information is issued to said interrupt issuing region.

20. The program according to claim 19, wherein said interrupt issuing region is provided in a global memory space to which other nodes can make direct access and said interrupt issuing region is related to predetermined components of a plurality of interrupt issuing destination nodes; and
the computer is caused to function so as to transmit said predetermined information to an address of said predetermined component of corresponding said interrupt issuing destination node by issuing said predetermined information to said interrupt issuing region related to said predetermined component of said interrupt issuing destination node.

21. The program according to claim 19, wherein said interrupt issuing region is provided in a local memory space to which only the program can make direct access, and is configured from an interrupt issuing destination node specifying region for specifying said interrupt issuing destination node and an interrupt generating region for issuing said predetermined information; and
wherein said predetermined information is issued to said interrupt generating region causing the computer to function so as to transmit said specified predetermined information to said interrupt issuing destination node, after said interrupt issuing destination node is specified as said interrupt issuing destination node specifying region.

22. A program embodied in a computer-readable medium which causes a computer to function as control means for causing a CPU executing the program to generate an interrupt,
wherein an interrupt command is transmitted to said CPU when predetermined information is received and when a node is permitted access to an access permissible node information memory means by an interrupt issuing source node which transmitted said predetermined information, said interrupt command is transmitted by referring to said access permissible node information memory means for storing information for determining said node that said access permissible node information memory means permits access to.

23. The program according to claim 22, wherein said control means is caused to function so as to cause said CPU to generate an interrupt by referring to said permissible node information memory means, when said predetermined information is transmitted to an address of a predetermined component of the program.

24. A record medium storing a program which causes a computer to transmit predetermined information to an address of a predetermined component for an interrupt issuing destination node, wherein said predetermined component for said interrupt issuing destination node is related to an interrupt issuing region in a memory space of the record medium, and predetermined information is issued to said interrupt issuing region.

25. The record medium according to claim 24, wherein said interrupt issuing region is provided in a global memory space to which other nodes can make direct access and said interrupt issuing region is related to predetermined components of a plurality of interrupt issuing destination nodes; and the computer is caused to function so as to transmit said predetermined information to an address of said predetermined component of corresponding said interrupt issuing destination node by issuing said predetermined information to said interrupt issuing region related to said predetermined component of said interrupt issuing destination node.

26. The record medium according to claim 24, wherein said interrupt issuing region is provided in a local memory space to which only the program can make direct access, and is configured from an interrupt issuing destination node specifying region for specifying said interrupt issuing destination node and an interrupt generating region for issuing said predetermined information; and wherein said predetermined information is issued to said interrupt generating region causing the computer to function so as to transmit said specified predetermined information to said interrupt issuing destination node, after said interrupt issuing destination node is specified as said interrupt issuing destination node specifying region.

27. A record medium storing a program which causes a computer to function as control means for causing a CPU of a permitted node to generate an interrupt, wherein an interrupt command is transmitted to said CPU when predetermined information is received and when a node is permitted access to an access permissible node information memory means by an interrupt issuing source node which transmitted said predetermined information, said interrupt command is transmitted by referring to said access permissible node information memory means for storing information for determining said node that said access permissible node information memory means permits access to.

28. The record medium according to claim 27, wherein said control means is caused to function so as to cause said CPU to generate an interrupt by referring to said permissible node information memory means, when said predetermined information is transmitted to an address of a predetermined component of the permitted.

* * * * *